United States Patent
Luo

(10) Patent No.: US 12,314,639 B1
(45) Date of Patent: May 27, 2025

(54) PREFABRICATED BUILDING DESIGN AND CONSTRUCTION INTEGRATED COLLABORATIVE METHOD BASED ON COMPONENT PARAMETER LIBRARY

(71) Applicant: NANJING TECH UNIVERSITY, Nanjing (CN)

(72) Inventor: Jianing Luo, Nanjing (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/519,951

(22) Filed: Nov. 27, 2023

Related U.S. Application Data

(63) Continuation of application No. PCT/CN2023/105443, filed on Jun. 30, 2023.

(51) Int. Cl.
  *G06F 30/20* (2020.01)
  *G06F 30/12* (2020.01)
  (Continued)

(52) U.S. Cl.
  CPC .............. *G06F 30/20* (2020.01); *G06F 30/12* (2020.01); *G06F 30/13* (2020.01); *G06F 2111/02* (2020.01); *G06F 2111/20* (2020.01)

(58) Field of Classification Search
  CPC .......... G06F 30/00; G06F 30/20; G06F 30/13; G06F 2111/02; G06F 2111/20
  (Continued)

(56) References Cited

FOREIGN PATENT DOCUMENTS

| CN | 107967399 A | 4/2018 |
|---|---|---|
| CN | 113190899 A | 7/2021 |

(Continued)

OTHER PUBLICATIONS

Zhang, Guolai, "Construction Schedule Control Method of Prefabricated Building Based on BIM", 2022, International Conference on Informatics, Networking and Computing (ICINC). (Year: 2022).*

(Continued)

*Primary Examiner* — Cedric Johnson
(74) *Attorney, Agent, or Firm* — Valet Patent Service Limited

(57) ABSTRACT

A prefabricated building design and construction integrated collaborative method based on component parameter library, which belongs to a field of prefabricated building design and construction technology, comprising: constructing a BIM parameter system for a prefabricated building and its prefabricated components, and establishing a component parameter library of the prefabricated components of the prefabricated building based on the BIM parameter system. By forming the component parameter library through the BIM parameter system of the prefabricated building and its prefabricated components, architects are provided with accurate information that meets the subsequent construction requirements and the construction requirements of various disciplines in schematic design and detailed design, and guided to apply BIM and select appropriate prefabricated components for design, so as to increase depth of first design, and improve accuracy for design optimization. Therefore, prefabricated building design and construction integrated collaboration is promoted.

10 Claims, 5 Drawing Sheets

(51) Int. Cl.
*G06F 30/13* (2020.01)
*G06F 111/02* (2020.01)
*G06F 111/20* (2020.01)

(58) Field of Classification Search
USPC .............................................. 703/6
See application file for complete search history.

(56) References Cited

FOREIGN PATENT DOCUMENTS

| CN | 115168971 A | * | 10/2022 |
| CN | 115310182 A | * | 11/2022 |
| CN | 116126852 A | * | 5/2023 |
| WO | 2022087678 A | | 5/2022 |

OTHER PUBLICATIONS

Yang, Yizhi, "Genetic Algorithm Based Optimization of Construction Site Layout of Prefabricated Buildings", Apr. 14-16, 2021, IEEE Asian-Pacific Conference on Image Processing, Electronics and Computers (IPEC). (Year: 2021).*
International Search Report (PCT/CN2021/080526); Date of Mailing: Aug. 22, 2023.
Research on detailed design methods of precast components in prefabricated buildings based on BIM technology, Oct. 15, 2021.
Research on the Application of BIM Technology in PC prefabricated Building, Feb. 15, 2021.

* cited by examiner

| Type | Graph | Design BIM parameter information of a component group in a prefabricated steel structure project ||||||||| 
| | | Horizontal parameter_ component material | Horizontal parameter_ component length | Horizontal parameter_ component width | Horizontal parameter_ component height | Longitudinal parameter_co mpletion condition | Longitudinal parameter_planned completion time | Vertical parameter_component connection position | Vertical parameter_component connection method | Vertical parameter_assembly tool |
| --- | --- | --- | --- | --- | --- | --- | --- | --- | --- | --- |
| Beam-01 | | Steel_Q235 | 2800 | 180 | 180 | Completed | 2018/07/09 | | | 1.Crane (SANY STC250C2) 2.Steel cable |
| Beam-01 | | Steel_Q235 | 2790 | 180 | 180 | Completed | 2018/07/09 | | | 1.Crane (SANY STC250C2) 2.Steel cable |
| Beam-02 | | Steel_Q235 | 2400 | 200 | 200 | Completed | 2018/07/09 | | | 1.Crane (SANY STC250C2) 2.Steel cable |

FIG. 2

PREFABRICATED BUILDING DESIGN AND
CONSTRUCTION INTEGRATED
COLLABORATIVE METHOD BASED ON
COMPONENT PARAMETER LIBRARY

TECHNICAL FIELD

The present disclosure belongs to a field of prefabricated building design and construction technology, and more particularly, relates to a prefabricated building design and construction integrated collaborative method based on component parameter library.

BACKGROUND

Prefabricated building refers to a building in which prefabricated components are assembled on site. The current schematic design of prefabricated building design (building standardization design/pre-construction design) mainly uses graphical design logic means such as mathematical constraints, formal constraints and combination constraints to achieve the basic design optimization principle of "less specifications, more combinations" of the prefabricated building components, in order to achieve the goal of integrated design and construction. BIM (i.e., Building Information Model) technology is mainly used in detailed design (later-stage building design), while the integrated application of BIM and Internet of Things is mainly carried out in the construction stage. Both have a goal to use digital and information methods to reduce errors, omissions, collisions, missings and other problems within and between disciplines, and to reach the ultimate goal of integrated design and construction by improving a degree of match between building design and actual construction, thereby improving the quality, performance and construction efficiency of the prefabricated building.

However, the inventor believes that the current prefabricated building schematic design in off-site construction (building standardization design/pre-construction design) used by architects is mainly based on graphical design logic means such as mathematical constraints, formal constraints and combination constraints, while the BIM technology used in detailed design (later-stage building design) is mainly based on information management methods such as information integration, information transmission and collision check optimization. However, there certain differences in design thinking, design process and design habits between schematic design and detailed design (design development and construction documents). Meanwhile, whether it is in the schematic design or in the detailed design, a certain level of breadth, depth, and precision for design scope needs to be achieved. The construction process-oriented becomes even more important, requiring a higher level of prerequisite, integration, and authenticity for the design outcome. The traditional "design-modify-build" (designing, modifying and building at the same time) as-built oriented execution approach is no longer applicable in off-site construction. However, the current methods of detailed design, such as "split design", "component design" and "BIM re-modelling design (or reverse application)" which are complementary to standardized construction, face challenges in effectively conveying the concept of standardization to subsequent actual construction. This makes it difficult to achieve standardized production, transportation, and assembly, ensuring that the design meets the requirements of subsequent actual construction. As a result, it becomes challenging for the final design results to accurately match and directly guide the subsequent actual construction, leading to a certain degree of disparity and disconnection between design and construction. In the actual construction process, there is often a need for "secondary remedial design." However, it remains challenging to precisely identify the specific content and fundamental reasons for these discrepancies, making it difficult to promptly find effective solutions and responsive measures for targeted optimization. In addition, architects often face challenges in directly applying BIM to conduct standardized design in the prefabricated building schematic design stage (early-stage building design) and in the subsequent stages of detailed and optimization design. Due to the lack of necessary information for detailed design, it is difficult to clearly define the construction requirements for subsequent construction and various disciplines (such as structural, mechanical, and interior work). This makes it challenging for architects to grasp the depth and boundaries of prefabricated building design. Furthermore, architects have different design thinking, construction experience, and understanding of standardized design, which can lead to the adoption of individual design habits. Consequently, the depth of their designs is difficult to be quantified and unified, which hampers their ability to effectively and efficiently carry out early building design and subsequent detailed and optimization design work. Autodesk's BIM instruction manual points out that the application of BIM in the design stage mainly focuses on discovering and reducing collision errors in various disciplines (34%), and is rarely used directly in design optimization (8%). Later detailing and optimization of the design still rely on common building design software and custom tools (such as AutoCAD, Sketchup, and Rhino, etc.), which are difficult to update comprehensively, timely and accurately on the BIM. At the same time, the modification and optimization of building design need to be based on the checking and analyzing results of each round of "staged" design results of each discipline. Therefore, there is a certain passivity and lag, which affects the architects' efficiency in optimization of the design. At the same time, further exploration remains to be done on how to reasonably and effectively introduce Internet of Things technology into the architects' design work. At present, there is little research and practice in related aspects at home and abroad.

To this end, a prefabricated building design and construction integrated collaborative method based on a component parameter library is designed.

It should be noted that the information disclosed in the above Background section is only for enhancing understanding of the context of the present disclosure and therefore may include information that does not constitute the prior art.

SUMMARY

The inventor found through research that the current methods of detailed design, which are complementary to standardized construction, face challenges in effectively conveying the concept of standardization to subsequent actual construction. This makes it difficult to achieve standardized production, transportation, and assembly, ensuring that the design meets the requirements of subsequent actual construction, leading to a certain degree of disparity and disconnection between design and construction. In the actual construction process, there is often a need for "secondary remedial design." However, it remains challenging to precisely identify the specific content and fundamental reasons for these discrepancies, making it difficult to promptly find effective solutions and responsive measures for targeted optimization.

In view of at least one of the above technical problems, the present disclosure provides a prefabricated building design and construction integrated collaborative method based on a component parameter library, with specific technical solutions as follows:

A prefabricated building design and construction integrated collaborative method based on component parameter library, comprises following steps: Step 1: constructing a BIM file for the prefabricated building and its prefabricated components. In the created BIM file, new parameter entries are established, and parameter attributes are set. Each parameter entry and parameter attribute in the BIM are then associated individually with the categorized design and actual construction information of prefabricated components. Subsequently, titles for all parameter entries in the BIM are defined and created. These defined and created parameter entries, along with their corresponding parameter information, form the BIM parameter system. Step 2: establishing a component parameter library of the prefabricated components of the prefabricated building based on the BIM parameter system. Step 3: screening out prefabricated components in the component parameter library of the prefabricated components of the prefabricated building, according to the design and construction requirements of the prefabricated building. Early-stage prefabricated building schematic design is carried out, to form later-stage detailed design results; and then an initial BIM result model of the prefabricated building design is exported. Step 4: setting a scope and conditions for affirming that the BIM parameter design result information of the prefabricated components matches the actual construction information. Step 5: for the initial BIM result model of the prefabricated building design exported in step 3, integratedly collaborating the prefabricated building design result and the actual construction. Specific sub-steps of step 5 are listed below: Sub-step 1: by referring to the prefabricated component BIM parameter entries and parameter information, comparatively analyzing the BIM file for the prefabricated building and its prefabricated components set in step 1 and the initial BIM result model of prefabricated building design exported in step 3; respectively sorting out prefabricated component BIM parameter entries whose parameter information already exists and prefabricated component BIM parameter entries whose parameter information is missing; and listing specific prefabricated component BIM parameter entries whose parameter information is missing. Sub-step 2: for the prefabricated component BIM parameter entries whose parameter information already exists, comparatively analyzing the design information and the actual construction information, based on the scope and conditions set in the step 4; sorting out prefabricated component BIM parameter entries that conform to the actual construction information and prefabricated component BIM parameter entries that do not conform to the actual construction information, along with their parameter information; and listing specific prefabricated component BIM parameter entries that do not conform to the actual construction information. Sub-step 3: for the prefabricated component BIM parameter entries whose parameter information is missing as listed in sub-step 1, searching the component parameter library of the prefabricated components of the prefabricated building; if corresponding design and actual construction parameter information contents are found, then supplementing and adding the contents to the entries: if no corresponding design and actual construction parameter information contents are found, listing the corresponding prefabricated component BIM parameter entries whose parameter information is missing, and supplementing and adding contents to the entries based on the actual construction needs, to form a first optimized BIM of prefabricated building design results. Sub-step 4: for the prefabricated component BIM parameter entries that do not conform to the actual construction information as listed in sub-step 2, searching the component parameter library of the prefabricated components of the prefabricated building: if corresponding design and actual construction parameter information contents are found, modifying and improving the entries based on the actual construction information; if no corresponding design and actual construction parameter information contents are found, listing the corresponding BIM parameter entries whose parameter information is missing, and supplementing and adding contents to the entries based on the actual construction needs, to form a second optimized BIM of the prefabricated building design results. Step 6: merging the first optimized BIM of the prefabricated building design results and the second optimized BIM of the prefabricated building design results in step 5, to obtain a third optimized BIM of the prefabricated building design results. Step 7: merging and checking the BIM of design results in a discipline required for subsequent construction and the third optimized BIM of the prefabricated building design results obtained in step 6; if not passed, returning to step 5; if passed, obtaining a final optimized BIM of full-discipline design results for the prefabricated building. Since the parameters of the prefabricated component BIM serve as an information carrier and medium to reflect the prefabricated building design and actual construction, discrepancies between design and construction are precisely identified for comparative analysis and detailed optimization, which provides quantitative data support for prefabricated building design and construction integrated collaboration.

Compared with the prior art, the present disclosure has advantageous effects below:

1. The prefabricated component BIM parameters serve as an information carrier and medium to reflect prefabricated building design and actual construction, so that discrepancies between design and construction are precisely identified for comparative analysis and detailed optimization, which provides quantitative data support for prefabricated building design and construction integrated collaboration. In the early stage of prefabricated building design, the schematic design may be detailed to the actual construction level. In the detailed design stage, the design and construction integrated collaborative method can be used to guide building designers and designers of other disciplines to carry out staged, multi-discipline collaboration and precise modification and targeted optimization of BIM parameter entries and parameter information for the prefabricated components, to address the discrepancies between design and construction, so as to achieve "less modifications, more predictions" instead of the current design optimization and modification mode of "onerous checks, hurried modifications" which mainly focuses on BIM collision checking.

2. In the early stage of prefabricated building design, building designers and designers of other disciplines can be guided to use a real BIM virtual model of the prefabricated components to carry out design activities, especially to establish a systematic understanding of the completeness of construction information and related requirements for various disciplines, transform the current reverse BIM application model of "drawing first, then remodeling" to the forward BIM application model of "modelling first, drawing later", thereby solving problems such as lack of BIM information, low model quality, and poor information transmission.

3. BIM parameters are expanded as a main function of constraining primitive information, and the parameters of the BIM file for the prefabricated building and its prefabricated components are used as a carrier for storing and representing key design information of the prefabricated building and actual construction information, to serve as a medium for storage and transmission of prefabricated building design information and actual construction parameter information.

4. A component parameter library is formed through the BIM parameter system of the prefabricated building and its prefabricated components, provide architects with accurate information in schematic design and detailed design that meets subsequent construction requirements and construction requirements of various disciplines, guide the application of BIM to select appropriate prefabricated components for design, increase first design depth, improve accuracy of optimized design, and promote the integrated collaboration of prefabricated building design and construction. In the present disclosure, based on the component parameter library of the prefabricated components of the prefabricated building, the prefabricated component BIM in the component parameter library that meets the design and construction requirements of the prefabricated building and already contains design and actual construction parameter information is applied, to carry out prefabricated building design, such that the breadth, depth and accuracy standards of the schematic design are unified, and the initial BIM of the prefabricated building design results is exported. Then, by comparatively analyzing the design information and actual construction information for the BIM parameter entries and parameter information of the BIM and its prefabricated components, specific BIM parameter entries and parameter information that lead to discrepancies between design and construction can be found, located, counted and analyzed, which helps building designers and designers of other disciplines apply the design and construction integrated collaborative method, to carry out accurate and precise modifications and targeted optimization on the staged and multi-discipline collaboration, thereby reducing the number of repeated checks, analyses and optimizations.

BRIEF DESCRIPTION OF THE DRAWINGS

FIGS. 2 and 3 are detailed lists of design BIM parameter information of a component group in a steel structure project according to Embodiment 1 of the present disclosure.

DETAILED DESCRIPTION

In order to better understand the objective, structure and function of the present disclosure, the technical solutions in the embodiments of the present disclosure will be clearly and completely described below in conjunction with the accompanying drawings. Obviously, the described embodiments are some, but not all, of the embodiments of the present disclosure.

Figure 1:
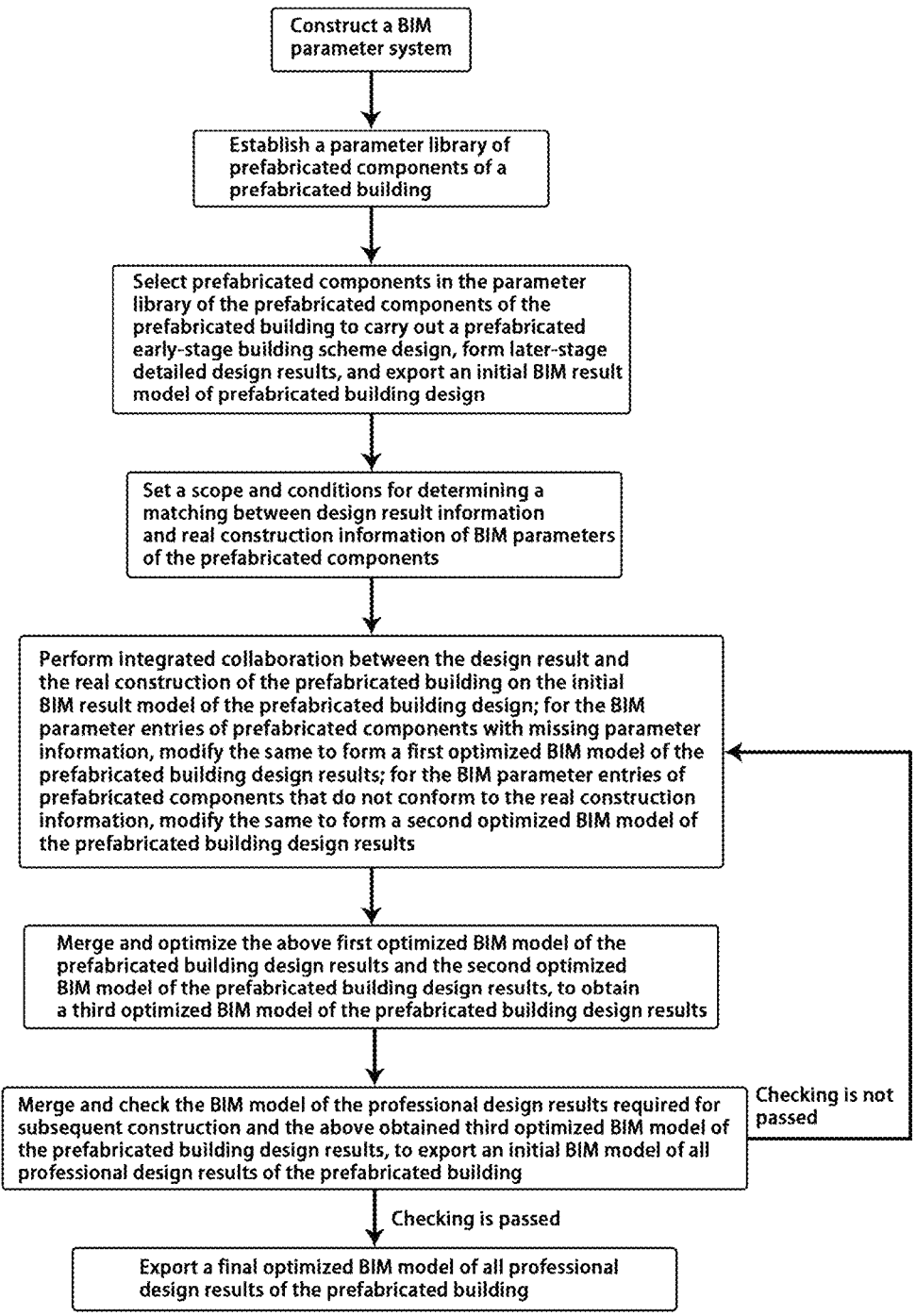
FIG. 1 is a flow chart of the present disclosure.

As shown in FIG. 1, a prefabricated building design and construction integrated collaborative method based on a component parameter library is designed, and comprises steps below:

Step 1: constructing a BIM file for the prefabricated building and its prefabricated components. In the created BIM file, new parameter entries are established, and parameter attributes are set. Each parameter entry and parameter attribute in the BIM are then associated individually with the categorized design and real construction information of prefabricated components. Subsequently, titles for all parameter entries in the BIM are defined and created. These defined and created parameter entries, along with their corresponding parameter information, form the BIM parameter system;

Step 2: establishing a component parameter library of the prefabricated components of the prefabricated building based on the BIM parameter system;

Step 3: screening out prefabricated components in the component parameter library of the prefabricated components of the prefabricated building, according to the design and construction requirements of the prefabricated building, wherein early-stage prefabricated building schematic design is carried out, to form later-stage detailed design results; and then an initial BIM result model of the prefabricated building design is exported;

Step 4: setting a scope and conditions for affirming that the BIM parameter design result information of the prefabricated components matches the actual construction information;

Step 5: for the initial BIM result model of the prefabricated building design exported in step 3, integratedly collaborating the prefabricated building design result and the actual construction. Specific sub-steps of step 5 are listed below: Sub-step 1: by referring to the prefabricated component BIM parameter entries and parameter information, comparatively analyzing the BIM file for the prefabricated building and its prefabricated components set in step 1 and the initial BIM result model of prefabricated building design exported in step 3; respectively sorting out prefabricated component BIM parameter entries whose parameter information already exists and prefabricated component BIM parameter entries whose parameter information is missing; and listing specific prefabricated component BIM parameter entries whose parameter information is missing. Sub-step 2: for the prefabricated component BIM parameter entries whose parameter information already exists, comparatively analyzing the design information and the actual construction information, based on the scope and conditions set in the step 4, sorting out prefabricated component BIM parameter entries that conform to the actual construction information and prefabricated component BIM parameter entries that do not conform to the actual construction information, along with their parameter information; and listing specific prefabricated component BIM parameter entries that do not conform to the actual construction information. Sub-step 3: for the prefabricated component BIM parameter entries whose parameter information is missing as listed in sub-step 1, searching the component parameter library of the prefabricated components of the prefabricated building; if corresponding design and actual construction parameter information contents are found, then supplementing and adding the contents to the entries; if no corresponding design and actual construction parameter information contents are found, listing the corresponding prefabricated component BIM parameter entries whose parameter information is missing, and supplementing and adding contents to the entries based on the actual construction needs, to form a first optimized BIM of prefabricated building design results. Sub-step 4: for the prefabricated component BIM parameter entries that do not conform to the actual construction information as listed in sub-step 2, searching the component parameter library of the prefabricated components of the prefabricated building: if corresponding design and actual construction parameter information contents are found, modifying and improving the entries based on the actual construction information; if no corresponding design and actual construction parameter information contents are found, listing the corresponding BIM parameter entries whose parameter information is missing, and supplementing and adding contents to the entries based on the actual construction needs, to form a second optimized BIM of the prefabricated building design results;

Step 6: merging the first optimized BIM of the prefabricated building design results and the second optimized BIM of the prefabricated building design results formed in step 5, to obtain a third optimized BIM of the prefabricated building design results;

Step 7: merging and checking the BIM of design results in a discipline required for subsequent construction and the third optimized BIM of the prefabricated building design results obtained in the step 6; if not passed, returning to the step 5; if passed, obtaining a final optimized BIM of full-discipline design results for the prefabricated building.

In the above implementation, two embodiments are listed to implement the above technical solution:

Embodiment 1

Figure 3:
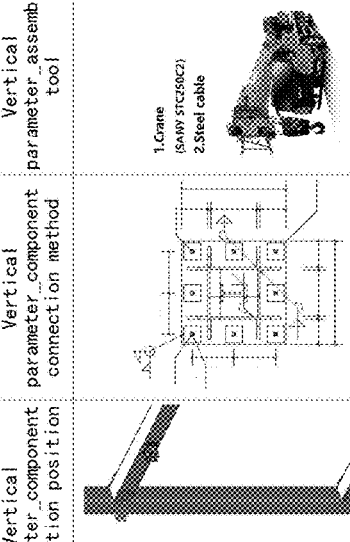

This embodiment provides a prefabricated building design and construction integrated collaborative method based on a component parameter library, by taking Column-01, a column component in a certain steel structure project, as a carrier, wherein, as shown in FIGS. 2 and 3, the certain steel structure project includes a component group composed of the 6 components, namely, 2 steel structure columns (Column-01, Column-02), 3 steel structure beams (Beam-01, Beam-01, Beam-02) and 1 glass curtain wall Wall-01. This method comprises steps of:

Step 1: using Autodesk Revit BIM software to construct a BIM family type file as the BIM file of the column component Column-01. In the constructed HABLA file, new parameter entries and setting parameter attributes are established, and 9 parameter entries in 3 categories are preset, which include: horizontal space parameters (component material, component length, component width and component height); longitudinal time parameters (completion status, planned completion time); vertical implementation parameters (component connection position, component connection method and assembly tools). The above parameters are imported into the project parameter manager of the Revit software; then the component group of this embodiment is selected; next, the parameter values are entered in the attribute column in sequence; and then the software detailed list is opened, for checking the parameter information. This ensures that the virtual construction parameters meet the design purpose, and provides data support for actual construction parameters of subsequent projects. Each parameter entry and parameter attribute of the column component Column-01 in the BIM are then associated individually with the categorized design information and actual construction information of prefabricated components. Subsequently, titles for all parameter entries of the column component Column-01 in the BIM are defined and created. These defined and created parameter entries, along with their corresponding parameter information, form the BIM parameter system. The parameters of prefabricated components serve as an information carrier and medium to reflect the design and actual construction of the prefabricated building, so that discrepancies between design and construction are precisely identified for comparative analysis and detailed optimization, which provides quantitative data support for prefabricated building design and construction integrated collaboration. The BIM parameter system for the prefabricated building and its prefabricated components constructed by using Autodesk Revit BIM family type files, along with the parameter entries therein, can guide building designers and designers in other disciplines to carry out relevant designs, such that the prefabricated building design and actual construction information are entered into the corresponding prefabricated component BIM parameter entries in the form of parameter information, to create prefabricated building design results (BIM) for each discipline;

Step 2: Establishing a component parameter library of the prefabricated components for the prefabricated building based on the BIM parameter system. A component parameter library is formed through the BIM parameter system for the prefabricated building and its prefabricated components, providing architects with accurate information that meets the requirements for subsequent construction and various disciplines (such as structural, mechanical, and interior work) in schematic design and detailed design, to guide selection of appropriate prefabricated components by using BIM and Internet of Things technology for design, increase the depth of the first design, by using BIM and fs improve the accuracy of optimized design, and promote the integrated collaboration of prefabricated building design and construction. The component parameter library includes BIMs of various prefabricated components, as well as various design and actual construction information stored through parameter entries and parameter information. In the component parameter library, prefabricated component parameter information is taken as a carrier, and the prefabricated building design results and actual construction are regarded as consisting of all parameter entries of various BIMs of the prefabricated components and their parameter information:

The component parameter library of the prefabricated components of the prefabricated building saves BIM of various prefabricated components by using information technology, and collects and stores design and actual construction information of prefabricated building components through BIM parameter entries and parameter information. This information can be, but not limited to, design and actual construction information of the prefabricated building components queried and downloaded through a specific web page, a BIM cloud platform, etc. The component parameter library focuses on various design and actual construction information stored in BIM parameter entries and parameter information of the prefabricated components of the prefabricated building. The categorizing method of the parameter entries and parameter information is correspondingly associated and consistent with the specific content of the parameter entries and parameter information of the BIM parameter system in step 1. The component parameter library is a design material warehouse in the prefabricated building design process, and is also a construction information warehouse that meets the construction requirements of various disciplines in the prefabricated construction process. The component parameter library, as a dynamic, constantly expanding design material warehouse and construction information warehouse for the prefabricated components and parameter information thereof, is an important basis for the design and construction of the prefabricated building, and has strong practicality;

Step 3: screening out prefabricated components in the component parameter library of the prefabricated components of the prefabricated building, according to the design and construction requirements of the prefabricated building. Early-stage prefabricated building schematic design is carried out, to form later-stage detailed design results; and then an initial BIM result model of the prefabricated building design is exported;

Step 4: setting a scope and conditions for affirming that the BIM parameter design result information of the prefabricated components matches the actual construction information.

The scope for affirming that the BIM parameter design information of the prefabricated components matches the actual construction information is set to include time BIM parameters, space BIM parameters, and implementation BIM parameters. The time BIM parameters correspond to the building design and actual construction information of the construction process; the space BIM parameters correspond to the building design and actual construction information of material composition; and the implementation BIM parameters correspond to the building design and actual construction information implemented by the prefabricated building and its component technologies. The time BIM parameters include planned and real completion periods (minutes/hours/days), completion status (completed/under construction/unfinished), assembly processes (steps), etc., as well as other BIM parameters related to the construction process; and the plan corresponds to building design information, which actually corresponds to actual construction information. The space BIM parameters include designed and real component geometric dimensions, component model descriptions, material physical parameters, detailed composition and construction, and other BIM parameters related to material composition; and the design corresponds to building design information, which actually corresponds to actual construction information. The implementation BIM parameters include the design and real component connection methods, component connection positions, component assembly methods (stacking methods, lifting positions, etc.), assembly tools, etc., and other BIM parameters related to technical implementation; the design corresponds to building design information, which actually corresponds to actual construction information.

The conditions for affirming that the BIM parameter design information of prefabricated components matches the actual construction information are set to include: consistent numerical statistics between the design information of the BIM parameters and the actual construction information, consistent text description between the design information of the BIM parameters and the actual construction information, and consistent in image expression between the design information of the BIM parameters and the actual construction information; or any other relevant methods and technologies for affirming consistency between the design information of the BIM parameters and the actual construction information.

The basis for creating the design information of the prefabricated building and its prefabricated components includes the specific requirements, needs and related technical support documents of the prefabricated construction project, such as bidding documents, mission letters, relevant specifications, technical regulations and component technical data, as well as the design results carried out by building designers and designers in respective disciplines, based on the above-mentioned relevant documents and based on personal professional skills, professional knowledge and practical experience.

A source for collecting actual construction information includes existing technical data related to prefabricated components. The technical data includes technical drawings, technical specifications, and construction specifications of the prefabricated components. The technical drawings can be schematic drawings, detailed drawings, construction drawings, etc. If the prefabricated components have not been used in existing prefabricated construction projects, they are existing finished components, the source of information is the existing technical data related to the components, and the technical data includes the technical drawings of the components (schematic drawings, detailed drawings and construction drawings, etc.), technical specifications, construction specifications, etc. If prefabricated components have been used in existing prefabricated construction projects, then the information source, in addition to the technical data mentioned above, also comes from actual construction information collected from existing prefabricated construction projects, including information of the prefabricated components collected through radio frequency identification, code identification, laser scanning, image capturing and other related devices and Internet of Things technology in the factory manufacturing, mid-transportation and on-site construction stages. In the present disclosure, information during the factory manufacturing, mid-transportation and on-site construction stages can be collected by scanning the RFID chip or the pasted QR code in each prefabricated component with a handheld device. On such basis, the BIM of the prefabricated building established using Autodesk Revit software is improved;

Further, the actual construction information of the prefabricated building and its components described in the present disclosure may be collected based on Internet of Things technology, and the collected information data is fed back to the BIM cloud platform and relevant BIM parameters of the respective prefabricated components in the prefabricated building BIM file established by using the Autodesk Revit software in various disciplines. In the present disclosure, the cloud platform can be Autodesk BIM 360, on which the prefabricated building design result information may be compared with the actual construction information for the exported BIM of the prefabricated building, then analyzed and optimized according to the step 5. Through the BIM parameter system of the prefabricated building and its prefabricated components, BIM parameter integration and Internet of Things technology are used to collect building design and actual construction information of the prefabricated building and its prefabricated components, so that building designers and personnel in other disciplines can use the BIM as well parameter entries and parameter information of its prefabricated components as an information medium and bridge in the early stage of prefabricated building design, to help the building designers and personnel in other disciplines use standardized, complete building design and actual construction information to carry out BIM forward application of prefabricated building design, and reduce the passivity and lag of optimized design, so as to accurately predict and locate and solve problems that may arise in subsequent actual construction. More importantly, establishment of component parameter library requires constant supplementation, updating and improvement. When the prefabricated components and their parameter information therein cannot meet the corresponding design and construction needs, actual construction information of prefabricated components can be collected by using the Internet of Things technology, R&D trial production and other relevant means. After relevant professional specification verification or technical demonstration is passed, the information is stored in the component parameter library for next use. BIM, BIM Cloud Platform (BIM-Cloud) and Internet of Things technology are used comprehensively, to carry out integration and statistics of BIM parameter information of the prefabricated building and its prefabricated components in the design stage, as well as tracking and feedback in the actual construction stage. Systematic collection of specific content of prefabricated building design information and actual construction parameter information is implemented in combination with the existing actual construction information of the prefabricated components of the prefabricated building.

The specific collection process may be as follows. The BIM of a component group in a certain steel structure project in Embodiment 1 is exported in the Revit software through the corresponding BIM cloud platform plug-in in the Revit software, and then imported into the BIM cloud platform, to generate a QR code or RFID chip for tracking and collecting the actual construction BIM parameter information of each prefabricated building component. Next, the QR code or RFID chip is pasted or embedded into the corresponding component as a carrier and basis for tracking component information. This process can be implemented in different stages such as component factory delivery, component transfer, or component assembly according to needs. During the actual construction process, the mobile phone APP is used to scan the QR code of the corresponding component, and the image data of the actual construction on site is uploaded to the BIM cloud platform. In the manual comparison between virtual construction and actual construction, relevant data can be extracted from the platform.

Step 5: for the initial BIM result model of the prefabricated building design exported in step 3, integratedly collaborating the prefabricated building design result and the actual construction. Specific sub-steps of step 5 are listed below.

Sub-step 1: by referring to the prefabricated component BIM parameter entries and parameter information, comparatively analyzing the BIM file for the prefabricated building and its prefabricated components set in step 1 and the initial BIM result model of prefabricated building design exported in step 3; respectively sorting out prefabricated component BIM parameter entries whose parameter information already exists and prefabricated component BIM parameter entries whose parameter information is missing; and listing specific prefabricated component BIM parameter entries whose parameter information is missing.

Wherein, automatic check is used for comparatively analyzing the design information and the actual construction, for the BIM parameter entries and parameter information of the BIM file for the prefabricated building and its prefabricated components. Automatic check is specifically: exporting the BIM file of the prefabricated building in IFC format in Autodesk Revit software, and setting BIM check rules in the check menu of the BIM check software Solibri Model Checker (SMC) software model. Preferably, taking the setting rules of space BIM parameter entries of the prefabricated components as an example, the check rule for parameter entries of the component geometric dimension is whether the tolerance values with other adjacent prefabricated components are met; the check rule for parameter entries of the detailed composition construction is whether enough space is left at the component connection position, etc. Based on the BIM parameter system of the prefabricated building and its prefabricated components, the BIM parameter entries and parameter information that can be detected by the BIM quality check software can be selected from the scope for affirming that the BIM parameter design result information matches the actual construction information of the prefabricated components set in the step 4. Preferably, the check rule according to the present disclosure is: finding the prefabricated component BIM parameter entries whose parameter information is missing; then running an automatic check program; and finally exporting check results from the BIM quality check software. If within the scope for affirming that the prefabricated component BIM parameter design result information matches the actual construction information as set in the step 4, remaining BIM parameter entries and parameter information cannot be detected by the BIM quality check software, then a detailed list is exported. Based on the exported check results and detailed list, prefabricated component BIM parameter entries whose parameter information already exists and prefabricated component BIM parameter entries whose parameter information is missing are sorted out. The specific BIM parameter entries whose parameter information is missing are listed. According to the conditions for affirming that the BIM parameter design result information of the prefabricated components matches the actual construction information as set in the step 4, the check results exported from the BIM quality check software are manually reviewed, to judge whether the BIM parameter design information conform to the actual construction information. The prefabricated component BIM parameter entries in the detailed list are compared item by item along with its parameter information, to judge whether the design information conforms to the actual construction information.

In the present disclosure, all 6 components pass the parameter information integrity check, that is, the parameter entries and parameter information conform to the virtual design, without missing or omission. Therefore, for automatic check of the parameter information in the present disclosure, DCY=9, DCQ=0. This result can be combined with manual check, to calculate matching degree values of individual components and the overall project. In tolerance check of adjacent components, a total of 6 components are identified and checked by the program, wherein, 3 components pass the check, that is, the component geometric dimensions met the design requirements; 3 components do not pass the check since they have errors, that is, the components do not meet the design requirements, and need to return to the BIM for dimension check or design optimization. According to the check results of the SMC software, it can be found that the 3 components of the steel structure beams, namely, Beam-01, Beam-01, and Beam-02 do not meet the design requirements of a minimum tolerance of 5 mm between components, and thus return to the Revit design model. The corresponding component dimensions are adjusted in sequence, that is, the component length parameter value of the two steel structure beams Beam-01 is adjusted from 2800 to 2790, and the component length parameter value of the steel structure beam Beam-02 is adjusted from 2400 to 2390. Having undergone Revit model parameter modification, the optimized model is imported into the SMC software again in IFC format, to undergo adjacent component tolerance check, and have the design results verified and optimized. After being checked again by the SMC software, all 6 components in the present disclosure pass the check, so it can be seen that this optimized design has achieved the intended goals. On the other hand, the component length parameters of the steel structure beams in the actual construction parameter statistical table can also prove from other perspectives that the optimized design meets the actual conditions.

Similarly, for comparative analysis between the design information and the actual construction information for the BIM parameter entries and parameter information of the BIM file for the prefabricated building and its prefabricated components, manual check is also applicable. Manual check is specifically: based on the BIM parameter system of the prefabricated building and its prefabricated components, and combined with the scope for affirming that the BIM parameter design result information of the prefabricated components matches the actual construction information set in step 4, opening the BIM of the prefabricated building in the Autodesk Revit software, then screening out the detailed list of prefabricated component BIM parameter entries and parameter information that need comparative analysis from the fields available in the detailed list attribute dialog box, sorting out prefabricated component BIM parameter entries whose parameter information already exists and prefabricated component BIM parameter entries whose parameter information is missing, according to the exported detailed list, and listing the specific prefabricated component BIM parameter entries whose parameter information is missing; next, comparing the prefabricated component BIM parameter entries item by item, along with their parameter information, based on the conditions for affirming that the BIM parameter design result information of the prefabricated components matches the actual construction information as set in the step 4, that is, comparing the design information of all BIM parameters of the prefabricated components in the exported detailed list with the actual construction information to determine consistency in numerical statistics, text description, and image expression, etc., so as to judge whether the design information conforms to the actual construction information; and finally sorting out the BIM parameter entries and its parameter information that do not conform to the actual construction information.

Specific steps are: exporting the design BIM parameter information detailed list in Revit software, manually reviewing the actual construction information of the prefabricated component BIM parameters and generating an actual construction parameter information statistical table, to verify whether the prefabricated component BIM parameter design matches the actual construction information.

In this embodiment, Table 1 shows match affirmation between the virtual design BIM parameter information of the steel structure beam component Beam-01 matches the actual construction information, as well as design optimization:

TABLE 1

Steel structure beam component Beam-01

| Parameter entry | | Comparison result | Affirmation reason | Optimization behavior |
|---|---|---|---|---|
| Horizontal parameter | Component material | √ | | None yet |
| | Component length | × | Inconsistent numerical statistics | The length of the indentation plate is 2390 mm |
| | Component width | √ | | None yet |
| | Component height | √ | | None yet |
| Longitudinal parameter | Completion status | √ | | None yet |
| | Planned completion time | √ | | None yet |
| Vertical parameter | Component connection position | √ | | None yet |
| | Component connection method | √ | | None yet |
| | Assembly tool | × | Inconsistent text description | According to the tool model, the lifting position is optimized, and the component weight is verified |

For the steel structure beam component Beam-01, the number of entries whose parameter information already exists is 9, and the number of entries whose parameter information is missing is 0, that is, DCY=9, DCQ=0; the component length parameter in the horizontal space parameters of the beam component does not conform to the preset, which belongs to the case of inconsistent numerical statistics between the design information of the BIM parameters and the actual construction information; the assembly tool parameter in the vertical implementation parameters does not conform to the preset, which belongs to the case of inconsistent text description between the design information of the BIM parameters and the actual construction information.

In this embodiment, Table 2 shows match analysis between the virtual design BIM parameter information of the steel structure column component Column-01 and the actual construction BIM parameter information, as well as evaluation calculation:

TABLE 2

Steel structure column component Colunm-01

| Parameter entry | | Comparison result | Determination reason | Optimization behavior |
|---|---|---|---|---|
| Horizontal parameter | Component material | √ | | None yet |
| | Component length | √ | | None yet |
| | Component width | √ | | None yet |
| | Component height | √ | | None yet |

TABLE 2-continued

Steel structure column component Column-01

| Parameter entry | | Comparison result | Determination reason | Optimization behavior |
|---|---|---|---|---|
| Longitudinal parameter | Completion status | √ | | None yet |
| | Planned completion time | × | Inconsistent text description | Dynamically adjusting subsequent assembly schedules |
| Vertical parameter | Component connection position | √ | | None yet |
| | Component connection method | × | Inconsistent image expression | Optimizing node sample |
| | Assembly tool | × | Inconsistent description | According to the tool model, the lifting position is optimized, and the component weight is verified |

For the steel structure column component Column-01, the real completion time parameter in the longitudinal time parameters and the assembly tool parameter in the vertical implementation parameters do not conform to the presets, which also belongs to the case of inconsistent text description between the design information of the of BIM parameters and the actual construction information; and the component connection method parameter in the vertical implementation parameters does not conform to the preset, which belongs to the case of inconsistent image expression between the design information of the BIM parameters and the actual construction information.

Sub-step 2: for the prefabricated component BIM parameter entries whose parameter information already exists, comparatively analyzing the design information and the actual construction information, based on the scope and conditions as set in the step 4; sorting out prefabricated component BIM parameter entries that conform to the actual construction information and prefabricated component BIM parameter entries that do not conform to the actual construction information, along with their parameter information; and listing specific prefabricated component BIM parameter entries that do not conform to the actual construction information.

Sub-step 3: for the prefabricated component BIM parameter entries whose parameter information is missing as listed in sub-step 1, searching the component parameter library of the prefabricated components of the prefabricated building: if corresponding design and actual construction parameter information contents are found, then supplementing and adding the contents to the entries; if no corresponding design and actual construction parameter information contents are found, listing the corresponding prefabricated component BIM parameter entries whose parameter information is missing, and supplementing and adding contents to the entries based on the actual construction needs, to form a first optimized BIM of prefabricated building design results.

Sub-step 4: for the prefabricated component BIM parameter entries that do not conform to the actual construction information as listed in sub-step 2, searching the component parameter library of the prefabricated components of the prefabricated building; if corresponding design and actual construction parameter information contents are found, modifying and improving the entries based on the actual construction information; if no corresponding design and actual construction parameter information contents are found, listing the corresponding BIM parameter entries whose parameter information is missing, and supplementing and adding contents to the entries based on the actual construction needs, to form a second optimized BIM of the prefabricated building design results.

BIM parameters are expanded as a main function of constraining primitive information, and the parameters of the BIM file for the prefabricated building and its prefabricated components are used as a carrier for storing and representing key design information of the prefabricated building and actual construction information, to serve as a medium for storage and transmission of prefabricated building design information and actual construction parameter information.

Step 6: using Autodesk Revit software to import the first optimized BIM of the prefabricated building design results and the second optimized BIM of the prefabricated building design results, merging and updating the first optimized the prefabricated building design results and the second optimized BIM of the prefabricated building design results formed in the step 5 in the software, to export a third optimized BIM of the prefabricated building design results;

Step 7: using Autodesk Revit software to import the IFC format of the BIM of the design results of various disciplines (such as structural, mechanical, and interior work) required for subsequent construction; merging and checking the BIM of design results of a discipline required for subsequent construction and the third optimized BIM of the prefabricated building design results obtained in the step 6; if not passed, returning to the step 5; if passed, obtaining a final optimized BIM of full-discipline design results for the prefabricated building. The prefabricated component BIM parameters serve as an information carrier and medium to reflect prefabricated building design and actual construction, so that discrepancies between design and construction are precisely identified for comparative analysis and detailed optimization, which provides quantitative data support for prefabricated building design and construction integrated collaboration.

Embodiment 2

Figure 4:
FIGS. 4 and 5 are detailed lists of design BIM parameter information of a component group in a certain prefabricated reinforced concrete structure project in Embodiment 2 of the present disclosure.
Figure 5:

This embodiment provides a prefabricated building design and construction integrated collaborative method based on a component parameter library, by taking YTB-01, a balcony slab component in a certain prefabricated concrete structure project, as a carrier, wherein, as shown in FIGS. 4 and 5, the prefabricated concrete structure project includes a component group composed of a total of 4 components: 1 precast concrete balcony slab component YTB-01, 1 precast concrete balcony partition YTGB-01 and 2 precast concrete balcony railings YTLB-01 and YTLB-02. This method includes steps of:

Step 1: using Autodesk Revit BIM software to constitute a BIM family type file as a BIM file for the prefabricated components of the prefabricated building. In the constructed BIM file, new parameter entries and setting parameter attributes are established, and 10 parameter entries in 3 categories are preset, which include: horizontal space parameters (component material, component length, component width, and component height), longitudinal time parameters (completion status, planned completion time); and vertical implementation parameters (support point position, component connection position, component connection method and assembly tool). The above parameters are imported into the project parameter manager of the Revit software; then the component group of this embodiment is selected; next, the parameter values are entered in the attribute column in sequence; and then the software detailed list is opened, for checking the parameter information. This ensures that the virtual construction parameters conform to the design purpose, and provides data support for the actual construction parameters of the subsequent project.

For the implementation method of tracking and feeding back the component parameter information relying on the BIM platform and the Internet of Things, Embodiment 1 may be referred to for details. In the Revit software, the BIM of a component group in a steel structure project in Embodiment 1 is exported through the corresponding BIM cloud platform plug-in in the Revit software, and imported into the BIM cloud platform to generate a QR code or RFID chip for tracking and collecting the actual construction BIM parameter information of each prefabricated building component. Next, the QR code or RFID chip is pasted or embedded into the corresponding component as a carrier and basis for tracking component information. This process can be implemented in different stages such as component factory delivery, component transfer, or component assembly according to needs. During the actual construction process, the mobile phone APP is used to scan the QR code of the corresponding component, and the image data of the on-site actual construction is uploaded to the BIM cloud platform. When the virtual construction and the actual construction are manually compared, relevant data can be extracted from the platform. The virtual construction parameter information detailed list of the present disclosure in Revit software is exported, for manually reviewing the actual construction information of the prefabricated component BIM parameters, to generate an actual construction parameter information statistical table in this embodiment.

In this embodiment, Table 3 shows match analysis between the virtual design BIM parameter information and actual construction information for the precast concrete balcony slab component YTB-01, as well as evaluation:

TABLE 3

Precast concrete balcony slab component YTB-01

| Parameter entry | | Comparison result | Determination reason | Optimization behavior |
|---|---|---|---|---|
| Horizontal parameter | Component material | √ | | None yet |
| | Component length | × | Inconsistent numerical statistics | The length of the indentation plate is 5380 mm |
| | Component width | √ | | None yet |
| | Component height | √ | | None yet |
| Longitudinal parameter | Completion status | | | Parameter missing |
| | Planned completion time | √ | | None yet |

TABLE 3-continued

Precast concrete balcony slab component YTB-01

| Parameter entry | | Comparison result | Determination reason | Optimization behavior |
|---|---|---|---|---|
| Vertical parameter | Support point position | √ | | None yet |
| | Component connection position | √ | | None yet |
| | Component connection method | √ | | None yet |
| | Assembly tool | × | Inconsistent text description | According to the tool model, the lifting position is optimized, and the component weight is verified |

It can be seen from Table 3 that the component length parameter in the horizontal space parameters of the precast concrete balcony slab components does not conform to the preset, which belongs to the case of inconsistent numerical statistics between the design information of the BIM parameters and the actual construction information; the assembly tool parameter in the vertical implementation parameters does not conform to the preset, which belongs to the case of inconsistent text description between the design information of the BIM parameters and the actual construction information.

Table 4 shows match analysis between the virtual design BIM parameter information of the precast concrete balcony railing YTLB-01 and the actual construction information, as well as evaluation:

TABLE 4

| Parameter entry | | Comparison result | Determination reason | Optimization behavior |
|---|---|---|---|---|
| Horizontal parameter | Component material | √ | | None yet |
| | Component length | × | Inconsistent numerical statistics | The length of the indentation plate is 2760 mm |
| | Component width | √ | | None yet |
| | Component height | √ | | None yet |
| Longitudinal parameter | Completion status | √ | | None yet |
| | Planned completion time | × | Inconsistent text description | Dynamically adjusting subsequent assembly schedules |
| Vertical parameter | Support point position | √ | | None yet |
| | Component connection position | × | Inconsistent image expression | Optimizing node sample |
| | Component connection method | √ | | None yet |
| | Assembly tool | × | Inconsistent text description | According to the tool model, the lifting position is optimized, and the component weight is verified |

It can be seen from the above that for the precast concrete balcony railing YTLB-01, the component length parameter in the horizontal space parameters does not conform to the preset, which belongs to the case of inconsistent numerical statistics between the design information of BIM parameters and the actual construction information; the real completion time parameter in the longitudinal time parameters and the assembly tool parameter in the vertical implementation parameters do not conform to the presets, which belongs to the case of inconsistent text description between the design information of the BIM parameters and the actual construction information; and the component connection position in the vertical parameters does not conform to the preset, which belongs to the case of inconsistent image expression between the design information of the BIM parameters and the actual construction information.

Prefabricated component BIM parameter entries that conform to the actual construction information and prefabricated component BIM parameter entries that do not conform to the actual construction information along with their parameter information are sorted out. Specific prefabricated component BIM parameter entries that do not conform to the actual construction information are listed. For the prefabricated component BIM parameter entries whose parameter information is missing as listed in sub-step 1, the component parameter library of the prefabricated components of the prefabricated building is searched. If corresponding design and actual construction parameter information contents are found, then these contents are supplemented and added to the entries. If no corresponding design and actual construction parameter information contents are found, corresponding prefabricated component BIM parameter entries whose parameter information is missing will be listed, and contents are supplemented and added to the entries based on the actual construction needs, to form a first optimized prefabricated building design results. For the listed prefabricated component BIM parameter entries that do not conform to the actual construction information, the component parameter library of the prefabricated components of the prefabricated building is searched. If corresponding design and actual construction parameter information contents are found, the entries are modified and improved based on the actual construction information. If no corresponding design and actual construction parameter information contents are found, corresponding BIM parameter entries whose parameter information is missing will be listed, and contents are supplemented and added to the entries based on actual construction needs, to form a second optimized BIM of the prefabricated building design results. The Model before and after each optimization are merged and checked. If passed, a final optimized BIM of full-discipline design results for the prefabricated building will be obtained. If not passed, the entries will be modified and improved again based on the actual construction information. Repeat the above steps until the final optimized BIM of full-discipline design results for the prefabricated building is obtained.

It is understood that the present disclosure has been described through some embodiments. Those skilled in the art know that various changes or equivalent substitutions can be made to these features and embodiments without departing from the spirit and scope of the present disclosure. In addition, under the teaching of the present disclosure, modifications may be made to adapt the features and embodiments to the particular circumstances and materials without departing from the spirit and scope of the present disclosure. Therefore, the present disclosure is not limited to the specific embodiments disclosed herein, and all embodiments falling within the scope of the claims of the present application are within the scope of protection of the present disclosure.

What is claimed is:

1. A prefabricated building design and construction integrated collaborative method based on component parameter library, comprising steps of:
   step 1: constructing a Building Information Model (BIM) file for a prefabricated building and its prefabricated components, wherein, in the created BIM file, new parameter entries are established, and parameter attributes are set;
   each parameter entry and parameter attribute in the BIM are then associated individually with a categorized design and real construction information of prefabricated components;
   subsequently, titles for all parameter entries in the BIM are defined and created;
   these defined and created parameter entries, along with their corresponding parameter information, form the BIM parameter system;
   step 2: establishing a component parameter library of the prefabricated components of the prefabricated building based on the BIM parameter system;
   step 3: screening out prefabricated components in the component parameter library of the prefabricated components of the prefabricated building, according to the design and construction requirements of the prefabricated building; wherein, early-stage prefabricated building schematic design is carried out, to form later-stage detailed design results; and then an initial BIM result model of the prefabricated building design is exported;
   step 4: setting a scope and conditions for affirming that the BIM parameter design result information of the prefabricated components matches the actual construction information;
   step 5: for the initial BIM result model of the prefabricated building design exported in step 3, integratedly collaborating the prefabricated building design result and the actual construction, wherein specific sub-steps of step 5 are listed below: sub-step 1: by referring to the prefabricated component BIM parameter entries and parameter information, comparatively analyzing the BIM file for the prefabricated building and its prefabricated components set in step 1 and the initial BIM result model of prefabricated building design exported in step 3; respectively sorting out prefabricated component BIM parameter entries whose parameter information already exists and prefabricated component BIM parameter entries whose parameter information is missing; and listing specific prefabricated component BIM parameter entries whose parameter information is missing; sub-step 2: for the prefabricated component BIM parameter entries whose parameter information already exists, comparatively analyzing the design information and the actual construction information, based on the scope and conditions set in the step 4; sorting out prefabricated component BIM parameter entries that conform to the actual construction information and prefabricated component BIM parameter entries that do not conform to the actual construction information, along with their parameter information; and listing specific prefabricated component BIM parameter entries that do not conform to the actual construction information; sub-step 3: for the prefabricated component BIM parameter entries whose parameter information is missing as listed in sub-step 1, searching the component parameter library of the prefabricated components of the prefabricated building; if corresponding design and actual construction parameter information contents are found, then supplementing and adding the contents to the entries; if no corresponding design and actual construction parameter information contents are found, listing the corresponding prefabricated component BIM parameter entries whose parameter information is missing, and supplementing and adding contents to the entries based on the actual construction needs, to form a first optimized BIM of prefabricated building design results; sub-step 4: for the prefabricated component BIM parameter entries that do not conform to the actual construction information as listed in sub-step 2, searching the component parameter library of the prefabricated components of the prefabricated building: if corresponding design and actual construction parameter information contents are found, modifying and improving the entries based on the actual construction information; if no corresponding design and actual construction parameter information contents are found, listing the corresponding BIM parameter entries whose parameter information is missing, and supplementing and adding contents to the entries based on the actual construction needs, to form a second optimized BIM of the prefabricated building design results;

step 6: merging the first optimized BIM of the prefabricated building design results and the second optimized BIM of the prefabricated building design results formed in step 5, to obtain a third optimized BIM of the prefabricated building design results;

step 7: merging and checking the BIM of design results in a discipline required for subsequent construction and the third optimized BIM of the prefabricated building design results obtained in step 6; if not passed, returning to step 5; if passed, obtaining a final optimized BIM of full-discipline design results for the prefabricated building.

2. The prefabricated building design and construction integrated collaborative method based on a component parameter library according to claim 1, wherein, the sub-step 3 and the sub-step 4 in the step 5 are summarized, and the BIM parameter entries whose parameter information and the BIM parameter entries that do not conform to the actual construction information, along with BIM parameter information supplemented, added, modified and improved correspondingly after checking the final optimized BIM of full-discipline results for the prefabricated building as listed in the step 7 are updated in the component parameter library of the prefabricated components of the prefabricated building described established in the step 2.

3. The prefabricated building design and construction integrated collaborative method based on component parameter library according to claim 1, wherein, the scope for affirming that the BIM parameter design information of the prefabricated components matches the actual construction information as set in the step 4 comprises time BIM parameters, space BIM parameters, and implementation BIM parameters;

wherein the time BIM parameters correspond to the building design and actual construction information of a construction process;

the space BIM parameters correspond to the building design and actual construction information of material composition;

and the implementation BIM parameters correspond to the building design and actual construction information implemented by the prefabricated building and its component technologies.

4. The prefabricated building design and construction integrated collaborative method based on component parameter library according to claim 1, wherein, the component parameter library of the prefabricated components of the prefabricated building collects and stores the design and actual construction information of prefabricated building components through BIM parameter entries and parameter information.

5. The prefabricated building design and construction integrated collaborative method based on a component parameter library according to claim 1, wherein, a basis for creating the design information of the prefabricated building and components thereof includes specific requirements, needs and related technical support documents of a prefabricated building project.

6. The prefabricated building design and construction integrated collaborative method based on component parameter library according to claim 1, wherein, a source for collecting actual construction information comprises existing technical data related to the prefabricated components, and the technical data includes technical drawings, technical specifications, and construction specifications of the prefabricated components.

7. The prefabricated building design and construction integrated collaborative method based on component parameter library according to claim 1, wherein, the actual construction information of the prefabricated building and components thereof is collected based on an Internet of Things technology, and the collected information data is fed back to a BIM cloud platform and relevant BIM parameters of respective prefabricated components in BIM files in respective disciplines, so as to continue match comparison between the prefabricated building design result information and the actual construction information for the exported BIM of the prefabricated building, as well as analysis and optimization according to the step 5.

8. The prefabricated building design and construction integrated collaborative method based on component parameter library according to claim 1, wherein, for comparative analysis between the design information and the actual construction, for the BIM parameter entries and parameter information of the BIM file for the prefabricated building and its prefabricated components, manual check and/or automatic check may be applied.

9. The prefabricated building design and construction integrated collaborative method based on component parameter library according to claim 8, wherein, a specific mode of manual check is:

based on the BIM parameter system of the prefabricated building and its prefabricated components, and combined with the scope for affirming that the BIM parameter design result information of the prefabricated components matches the actual construction information set in step 4, exporting a detailed list including the prefabricated component BIM parameter entries and parameter information from the BIM of the prefabricated building;

sorting out prefabricated component BIM parameter entries whose parameter information already exists and prefabricated component BIM parameter entries whose parameter information is missing, according to the exported detailed list, and listing the specific prefabricated component BIM parameter entries whose parameter information is missing;

comparing the prefabricated component BIM parameter entries item by item, along with their parameter information in the exported detailed list, based on the conditions for affirming that the BIM parameter design result information of the prefabricated components matches the actual construction information as set in the step 4, to judge whether the design information conforms to the actual construction information.

10. The prefabricated building design and construction integrated collaborative method based on component parameter library according to claim 8, wherein, a specific mode of automatic check is:

importing the BIM of the prefabricated building into a BIM quality check software;

based on the BIM parameter system of the prefabricated building and its prefabricated components, selecting the BIM parameter entries and parameter information that can be detected by the BIM quality check software within the scope for affirming that the BIM parameter design result information of the prefabricated components matches the actual construction information as set in the step 4, setting checking rules, then running an automatic check program, and finally exporting check results from the BIM quality check software;

exporting a detailed list for remaining BIM parameter entries and parameter information that cannot be detected by the BIM quality checking software within the scope for affirming that the BIM parameter design result information of the prefabricated components matches the actual construction information as set in the step 4; based on the exported check results and the detailed list, sorting out prefabricated component BIM parameter entries whose parameter information already exists and prefabricated component BIM parameter entries whose parameter information is missing, and listing specific prefabricated component BIM parameter entries whose parameter information is missing;

according to the conditions for affirming that the BIM parameter design result information of the prefabricated components matches the actual construction information as set in the step 4, manually reviewing the check results, to judge whether the BIM parameter design information exported from the BIM quality check software conforms to the actual construction information, and comparing the prefabricated component BIM parameter entries in the detailed list item by item along with their parameter information, to judge whether the design information conforms to the actual construction information.

\* \* \* \* \*